(12) United States Patent
Liang et al.

(10) Patent No.: US 12,228,842 B2
(45) Date of Patent: *Feb. 18, 2025

(54) RING LAMP SUPPORT FOR SHOOTING DEVICE

(71) Applicant: MARVEL TECHNOLOGY(CHINA) CO., LTD, Shenzhen (CN)

(72) Inventors: Jianhe Liang, Shenzhen (CN); Ruru Zhong, Shenzhen (CN)

(73) Assignee: MARVEL TECHNOLOGY(CHINA) CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,142

(22) Filed: Jan. 25, 2024

(65) Prior Publication Data

US 2024/0361672 A1    Oct. 31, 2024

Related U.S. Application Data

(63) Continuation-in-part of application No. 18/503,407, filed on Nov. 7, 2023.

(30) Foreign Application Priority Data

Apr. 25, 2023  (CN) .......................... 202320999465.7

(51) Int. Cl.
  *G03B 17/56* (2021.01)
  *G03B 15/02* (2021.01)
(52) U.S. Cl.
  CPC ........... *G03B 15/02* (2013.01); *G03B 17/561* (2013.01)

(58) Field of Classification Search
  None
  See application file for complete search history.

(56) References Cited

U.S. PATENT DOCUMENTS

| | | | |
|---|---|---|---|
| 11,808,438 B1* | 11/2023 | Shi | F21V 21/30 |
| 2016/0305646 A1* | 10/2016 | Marcus | H05K 5/0086 |
| 2017/0118385 A1* | 4/2017 | Vargas | G03B 15/03 |
| 2018/0109713 A1* | 4/2018 | Hennings | G06V 40/164 |
| 2019/0384143 A1* | 12/2019 | Lynch | G03B 17/53 |
| 2021/0055633 A1* | 2/2021 | Stotts | G03B 15/02 |
| 2021/0364892 A1* | 11/2021 | Copeland | F16M 13/022 |
| 2022/0070342 A1* | 3/2022 | Shen | H05B 47/19 |
| 2023/0220949 A1* | 7/2023 | Lei | F16M 11/18 248/123.11 |
| 2023/0221626 A1* | 7/2023 | Lei | F16M 11/08 396/419 |

* cited by examiner

*Primary Examiner* — Paul M Berardesca
(74) *Attorney, Agent, or Firm* — Daniel M. Cohn; Howard M. Cohn

(57) ABSTRACT

A shooting device that is convenient to fix a shooting terminal includes a first light emitting piece, a first circuit board, and a fixing piece. The first circuit board is electrically connected to the first light emitting piece. The first circuit board is configured to adjust color temperature, and/or color, and/or brightness of the first light emitting piece. The first light emitting piece is disposed on a peripheral side of the fixing piece. The fixing piece includes a top shell, a limiting frame, and a bottom shell. The limiting frame is connected between the top shell and the bottom shell. The shooting terminal is disposed in the limiting frame. A display surface of the shooting terminal abuts against an inner surface of the top shell to maintain fixation of the shooting terminal relative to the fixing piece.

12 Claims, 12 Drawing Sheets

RING LAMP SUPPORT FOR SHOOTING DEVICE

TECHNICAL FIELD

The present disclosure relates to a technical field of photography auxiliary devices, and in particular to a shooting device that is convenient to fix a shooting terminal.

BACKGROUND

A shooting device is a shooting auxiliary tool configured to support a shooting terminal so that the shooting terminal stably shoots a shooting object.

During a shooting process, according to needs of a shooting angle or characteristics of different shooting objects, it is commonly necessary to adjust the shooting angle of the shooting device (such as horizontal angle adjustment, vertical angle adjustment, rotation angle adjustment, and pitch angle adjustment), so that the shooting terminal shoots the shooting object at a suitable angles to create good shots.

According to the shooting device with a light supplementing lamp in the prior art, the light supplementing lamp is simply connected to a power supply through wires and a switch, and the light supplementing lamp is only turned on and off through the switch. The light supplementing lamp in the prior art does not have rich color temperature, color, brightness, and other adjustment functions, making supplementing light of the light supplementing lamp shining on subjects monotonous, thus leading to poor user experience.

SUMMARY

In view of this, the present disclosure provides a shooting device that is convenient to fix a shooting terminal, which enhances function richness of a light supplementing lamp through setting up circuit boards, thereby enhancing shooting experience of a user.

The present disclosure provides a shooting device that is convenient to fix a shooting terminal, including: a first light emitting piece, a first circuit board, and a fixing piece. The first circuit board is electrically connected to the first light emitting piece. The first light emitting piece is adjusted by the first circuit board to adjust color temperature, and/or color, and/or brightness. The first light emitting piece is disposed on a peripheral side of the fixing piece. The fixing piece includes a top shell, a limiting frame, and a bottom shell. The limiting frame is connected between the top shell and the bottom shell. The shooting terminal is disposed in the limiting frame. A display surface of the shooting terminal abuts against an inner surface of the top shell, maintaining fixation of the shooting terminal relative to the fixing piece.

Furthermore, the first light emitting piece is clamped and fixed between the top shell and the bottom shell, maintaining fixation of the first light emitting piece relative to the fixing piece.

Furthermore, the first light emitting piece includes at least one USB interface. The at least one USB interface is electrically connected to the shooting terminal. The bottom shell of the fixing piece defines a notch. A connecting wire connecting the shooting terminal to the at least one USB interface passes through the notch.

Furthermore, the top shell defines a limiting hole. The limiting hole is configured to limit the display surface of the shooting terminal and a camera of the shooting terminal.

Furthermore, heat dissipating holes are defined on the bottom shell.

The present disclosure provides a shooting device that is convenient to fix a shooting terminal, including: a support bracket, a universal adjusting piece, a first light emitting piece, a first circuit board, and a fixing piece. A power supply connecting line 13a of the first circuit board is connected from bottom to top along a height direction of the support bracket. The first light emitting piece is connected to the first circuit board. The first light emitting piece is adjusted by the first circuit board to adjust color temperature, and/or color, and/or brightness. The support bracket includes a base, a support rod, and a support body. A first end of the support rod is connected to the support body. A second end of the support rod is connected to the fixing piece through the universal adjusting piece. The fixing piece is configured to fix the shooting terminal. The base is connected to the support body. A limiting space is defined by the support rod to allow the first light emitting piece and the fixing piece to adjust pitching angles.

Furthermore, one end of the support rod close to the fixing piece defined a wire outlet hole.

Furthermore, the first light emitting piece is disposed on a peripheral side of the fixing piece. The first light emitting piece and the fixing piece synchronously adjust the pitch angles.

The present disclosure provides a shooting device that is convenient to fix a shooting terminal, including: a support body, a support rod, a first light emitting piece, a second light emitting piece, a power connector, a first circuit board, and a second circuit board. The second light emitting piece is disposed on the support body. The second light emitting piece is a light bar. The light bar is disposed along a vertical direction. The second light emitting piece is disposed below the first light emitting piece. Light emitting directions of the second light emitting piece are approximately the same as light emitting directions of the first light emitting piece. The first light emitting piece is electrically connected to the first circuit board. The second light emitting piece is electrically connected to the second circuit board. The first circuit board is configured to adjust a color temperature, and/or a color, and/or a brightness of the first light emitting piece. The power connector is configured to be connected to a power supply to supply power to the shooting device. The first light emitting piece and the second light emitting piece respectively receive power from the power supply through the first circuit board, the second circuit board, connecting wires, and the power connector.

Furthermore, the second light emitting piece is disposed in the support body. A light transmitting piece is disposed on a surface of the support body. Light of the second light emitting piece penetrates through the light transmitting piece.

Furthermore, the support body and the support rod are hollow structures. The connecting wires of the shooting device pass through the support body and the support rod.

Compared with the prior art, in the present disclosure, the fixing piece fixes the shooting terminal, the universal adjusting piece is disposed between the fixing piece and the support frame, and the first light emitting piece is disposed on the peripheral side of the fixing piece, so that the first light emitting piece synchronously moves with the shooting terminal, and the shooting terminal realizes pitch angle adjustment, left and right flip adjustment, and switch between a landscape mode and a portrait mode with respect to the support bracket, which not only enables the shooting terminal to quickly adjust the shooting angle in different dimensions, but also improves the adjusting efficiency. Further, a structure of the shooting device is simplified, the production costs are reasonably controlled, and the first light emitting piece always provides supplementary light to the shooting terminal.

Figure 1:
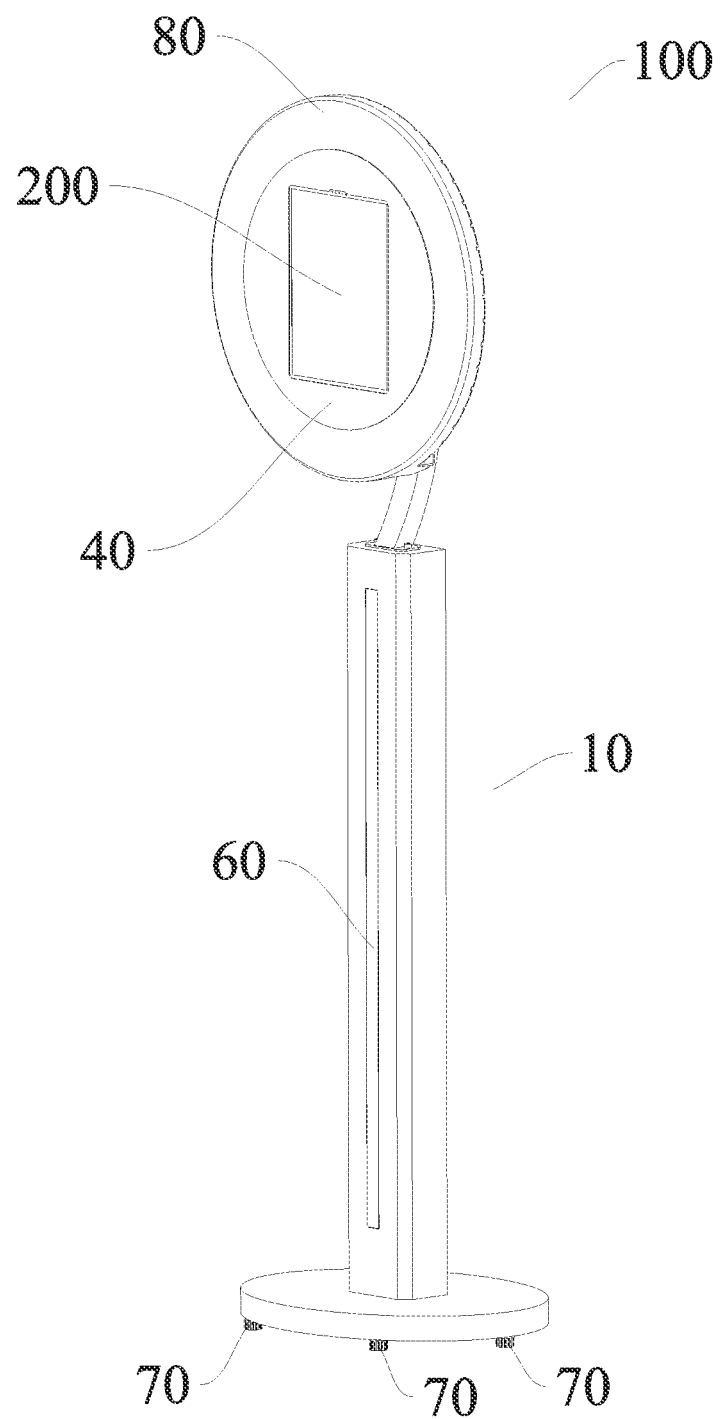
FIG. 1 is a schematic diagram showing an overall structure of a shooting device according to one embodiment of the present disclosure.
Figure 2:
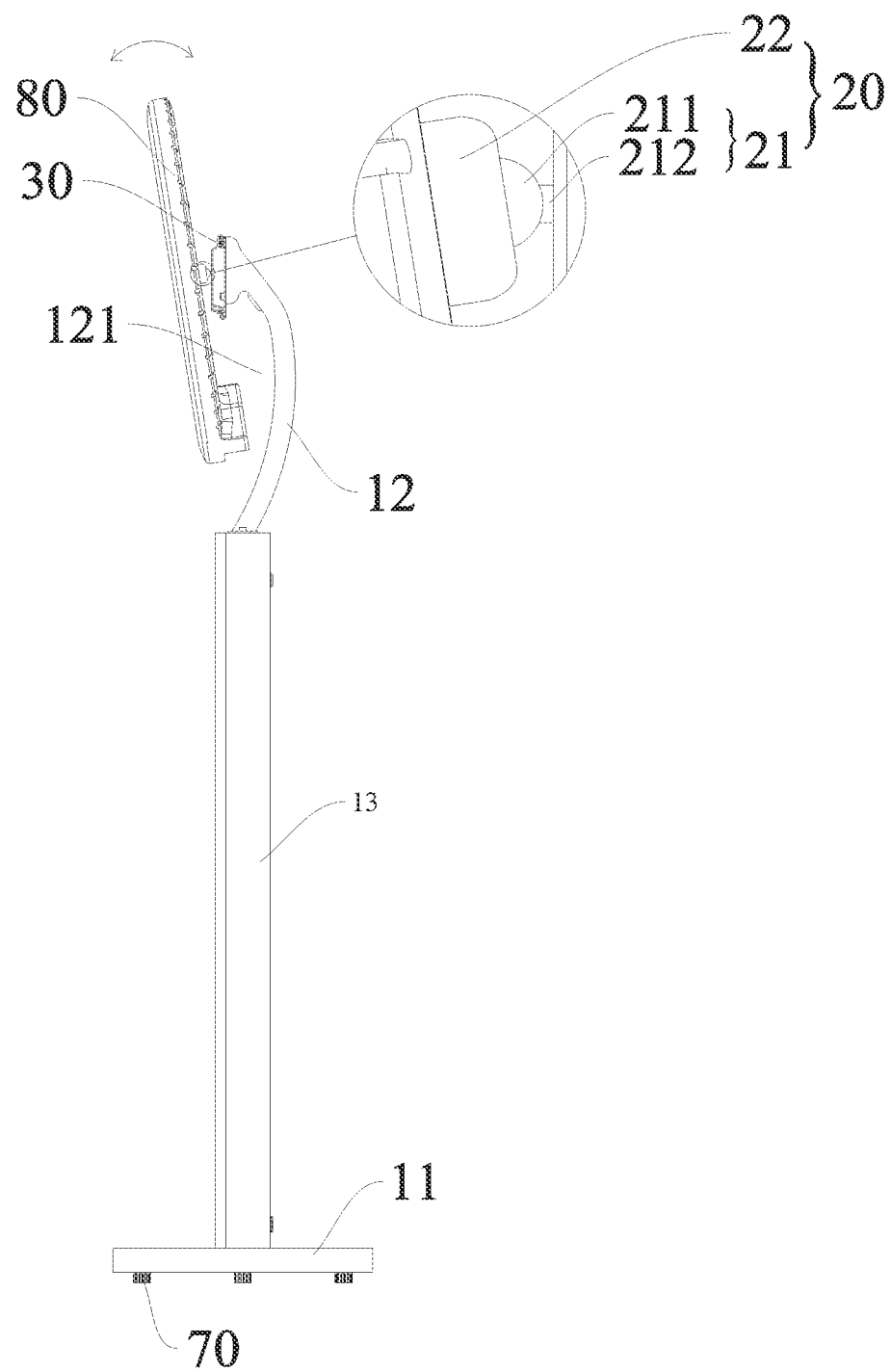
FIG. 2 is a side schematic diagram of the shooting device according to one embodiment of the present disclosure.
Figure 3:
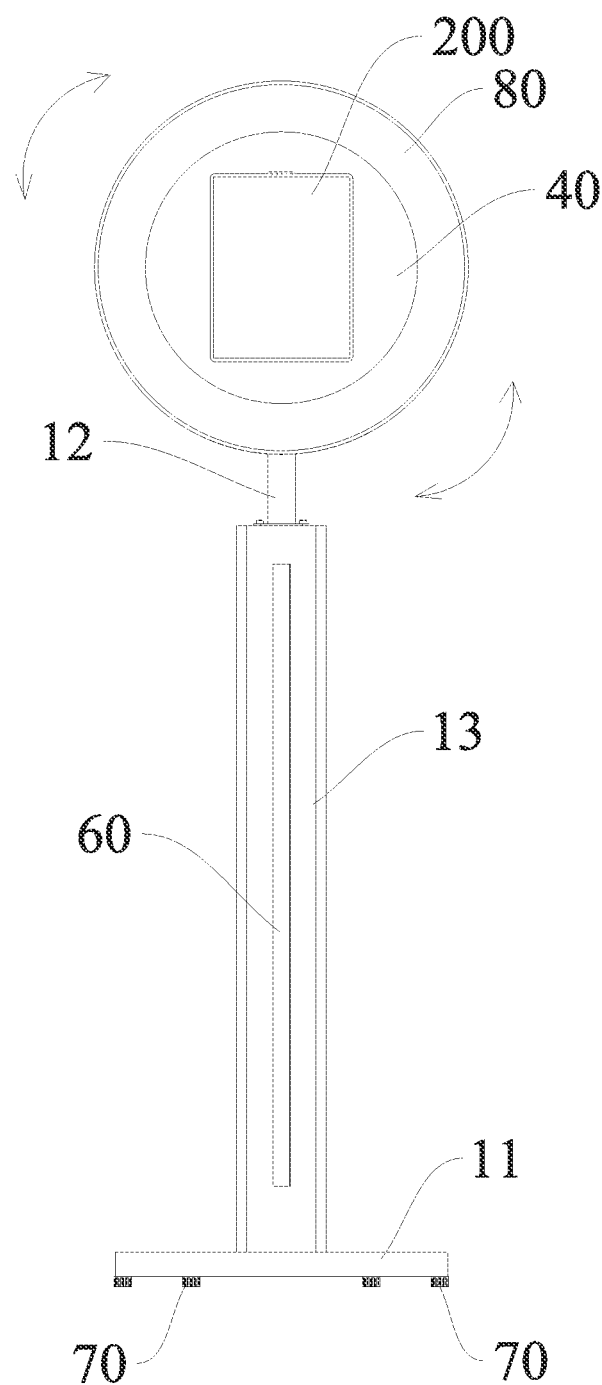
FIG. 3 is a front schematic diagram of the shooting device according to one embodiment of the present disclosure.
Figure 4:
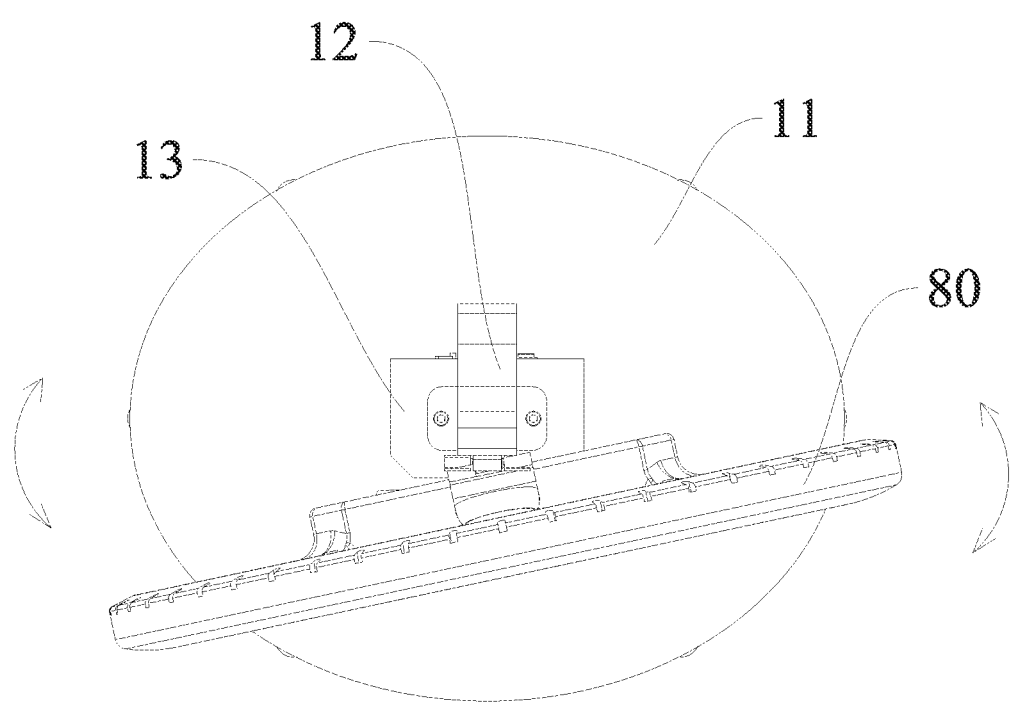
FIG. 4 is a top schematic diagram of the shooting device according to one embodiment of the present disclosure.

In the drawings: shooting device—100, support bracket—10, base—11, support rod—12, limiting space—121, wire outlet hole—122, support body—13, second circuit board—131, second switch—132, power connector—133, universal adjusting piece—20, ball head—21, head portion—211, rod portion—212, fixing rotating sleeve—22, quick—release connecting assembly—30, first connecting plate—31, first hooking portion—311, first limiting portion—312, first fixing hole—121, first inserting portion—313, second limiting portion—314, second connecting plate—32, second inserting portion—321, second hooking portion—322, blocking portion—323, second fixing hole—3231, first light emitting piece—80, fixing piece—40, top shell—41, limiting hole—411, limiting frame—42, bottom shell—43, first shell—431, second shell—432, heat dissipating hole—433, notch—434, limiting protrusion—435, abutting piece—44, locking piece—45, first circuit board—50, second light emitting piece—60, foot cup—70, first light emitting piece—80, first switch 81, USB interface—82, limiting groove—83, shooting terminal—200.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It is understood that the drawings are only provided for reference and illustration, and are not used to limit the present disclosure. The connection relationship shown in the drawings is only for the convenience of clear description, and does not intend to limit the connection mode.

It should be noted that when a component is considered to be "connected" to another component, it can be directly connected with another component, or there may be a centered component at the same time. Unless otherwise defined, all technical and scientific terms used herein have the same meaning as commonly understood by those skilled in the art of the present disclosure. It should be noted in the description of the present disclosure that, unless otherwise regulated and defined, terms such as "installation", "bonded", and "connection" shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

In addition, it should be noted that in the description of the present disclosure terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first", "second", and "third" are only used for the purpose of description, rather than being understood to indicate or imply relative importance.

As shown in FIGS. 1-4, the present disclosure provides a shooting device 100 that is convenient to adjust a shooting angle. The shooting device 100 includes a support bracket 10, a universal adjusting piece 20, a first light emitting piece 80, and a fixing piece 40. The fixing piece 40 is configured to fix a shooting terminal 200. The first light emitting piece 80 is disposed on a peripheral side of the fixing piece 40. The first light emitting piece 80 is configured to fill in light of a shooting object photographed by the shooting terminal 200. The universal adjusting piece 20 is connected between the support bracket 10 and the fixing piece 40. The universal adjusting piece 20 is configured to connect the fixing piece 40 and the first light emitting piece 80 to the support bracket 10 and adjust a shooting angle of the shooting terminal 200.

The shooting terminal 200 is, but is not limited to, a mobile phone, a tablet computer (such as an iPad), and other electronic products having a shooting function.

In one optional embodiment, the universal adjusting piece 20 is a shapeable coiled pipe. A first end of the shapeable coiled pipe is connected with the support bracket 10, and a second end of the shapeable coiled pipe is connected with the fixing piece 40.

Furthermore, the shapeable coiled pipe is of a hollow structure, so that a connecting wire (not shown in the drawings) configured to connect the first light emitting piece 80 and an external power source is allowed to pass through the shapeable coiled pipe, thereby preventing the connecting wire from being exposed and and improving an overall aesthetic effect of the shooting device 100.

In another optional embodiment, the universal adjusting piece 20 includes a ball head 21 and a fixing rotating sleeve 22, and the ball head 21 is rotatably disposed in the fixing rotating sleeve 22.

Furthermore, the ball head 21 includes a head portion 211 and a rod portion 212. The rod portion 212 is connected with the head portion 211, and the head portion 211 is rotatably disposed in the fixing rotating sleeve 22.

In one specific embodiment, the rod portion 212 of the ball head 21 is connected with the support bracket 10, and the fixing rotating sleeve 22 is connected with the fixing piece 40.

In another specific embodiment, the rod portion 212 of the ball head 21 is connected with the fixing piece 40, and the fixing rotating sleeve 22 is connected with the support bracket 10.

By providing the ball head 21 and the fixing rotating sleeve 22, disassembly and assembly between the fixing piece 40 and the support bracket are facilitated, so that the fixing piece 40 is able to be detached from the support bracket 10 to storage the shooting device 100.

Furthermore, the universal adjusting piece 20 further includes a fixing ring (not shown in the drawings). The fixing ring is detachably connected with the fixing rotating sleeve 22 and is at least partially limited to an outer side of the head portion 211, so as to enhance a limiting of the fixing rotating sleeve 22 to the ball head 21 and prevent the ball head 21 from falling off from the fixing rotating sleeve 22.

When the shooting angle of the shooting terminal 200 needs to be adjusted, the fixing piece 40 or the first light emitting piece 80 is directly held to adjust the shooting angle, so that the ball head 21 rotates relative to the fixing rotating sleeve 22 or the fixing rotating sleeve 22 rotates relative to the ball head 21, thereby quickly and efficiently completing adjustment of the shooting angle.

The first light emitting piece 80 is disposed on the peripheral side of the fixing piece 40, so that the first light emitting piece 80 and the fixing piece 40 synchronously move to adjust the shooting angle, which at the same time ensures that the first light emitting piece 80 always provides supplementary light to the shooting terminal 200.

By providing the universal adjusting piece 20, the shooting terminal 200 is allowed to perform pitching angle adjustment, left-right flip adjustment, and/or switch between a landscape mode, a portrait mode, and any angle between the landscape mode and portrait mode. Therefore, the universal adjustment piece 20 is enough to realize angle adjustment of the shooting terminal 200 in one and multiple dimensions, thereby improving the adjustment efficiency and the user experience. Further, a structure of the shooting device 100 is simplified and assembly efficiency of the shooting device 100 is improved, thereby reasonably controlling the production costs of the shooting device 100.

Furthermore, the fixing piece 40 includes a top shell 41 and a bottom shell 43 In one embodiment, the first light emitting piece 80 is a ring lamp. A hollow portion of the ring lamp is sandwiched between the top shell 41 and the bottom shell 43. That is, the fixing piece 40 is disposed on a hollow position of the ring lamp.

Specifically, an outer side of the fixing piece 40 is detachably connected with an inner side of the first light emitting piece 80 by means of screw locking, clamping, magnetic attraction connection, etc.

Figure 7:
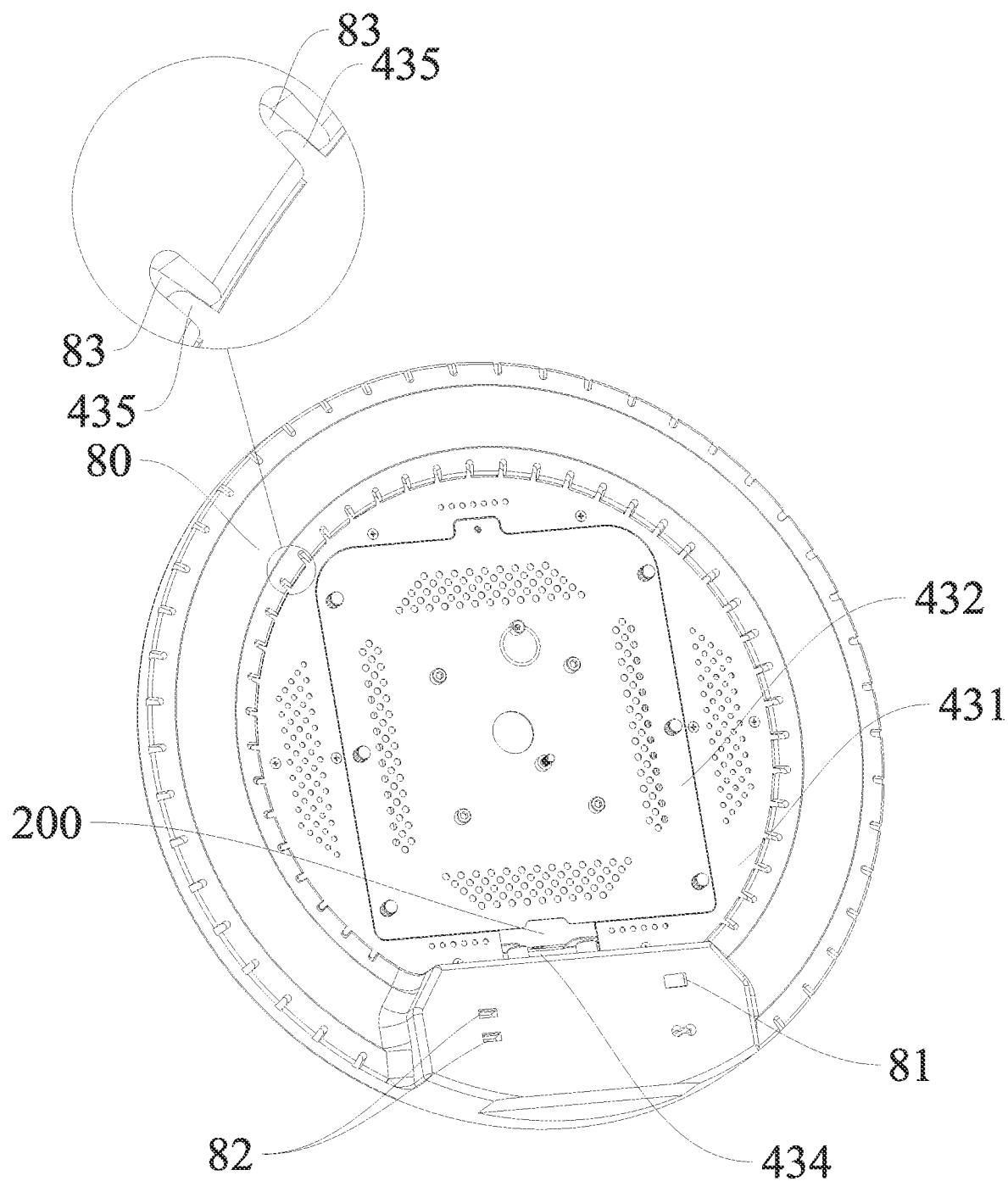
FIG. 7 is a schematic diagram of a first light emitting piece of the shooting device according to one embodiment of the present disclosure.
Figure 9:
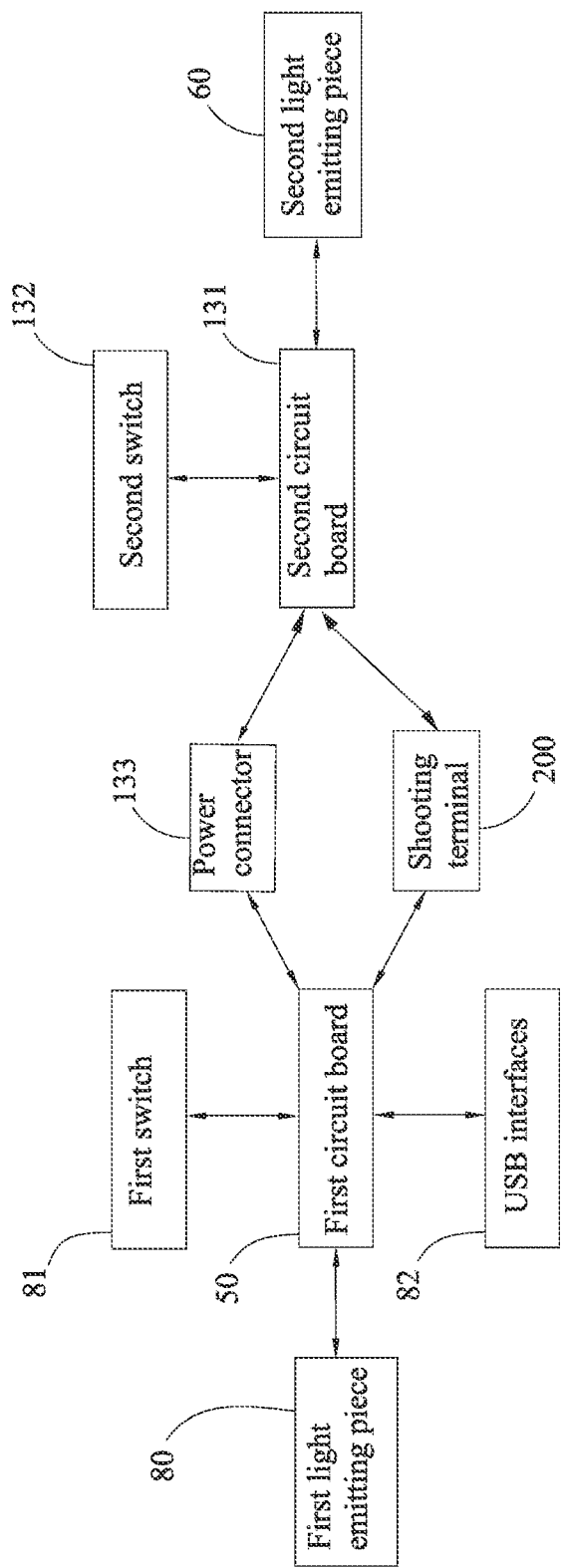
FIG. 9 is a schematic diagram showing a connecting relationship between components of the shooting device according to one embodiment of the present disclosure.
Figure 10:
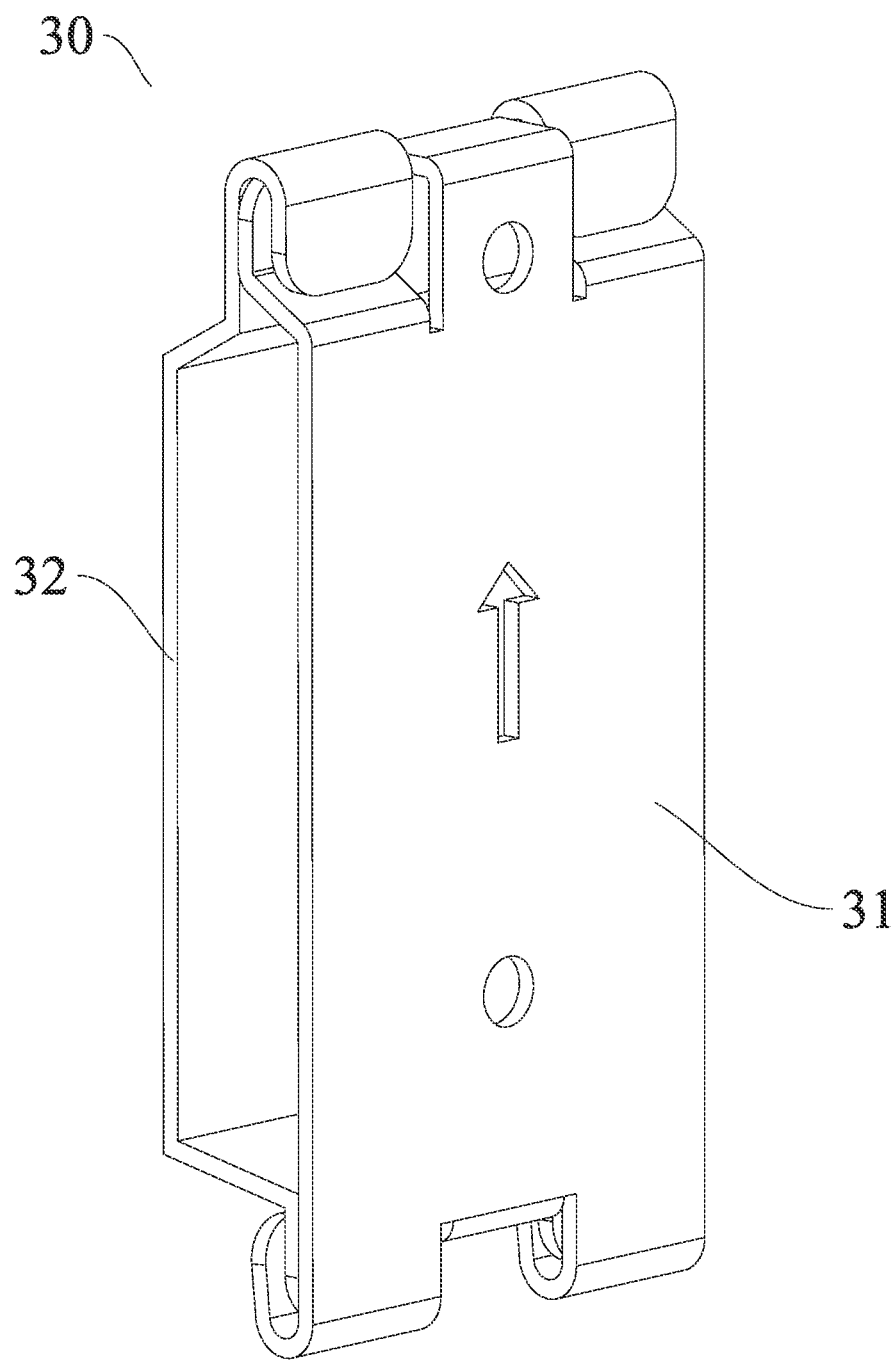
FIG. 10 is a schematic diagram of a quick-release connecting assembly of the shooting device according to one embodiment of the present disclosure.
Figure 11:
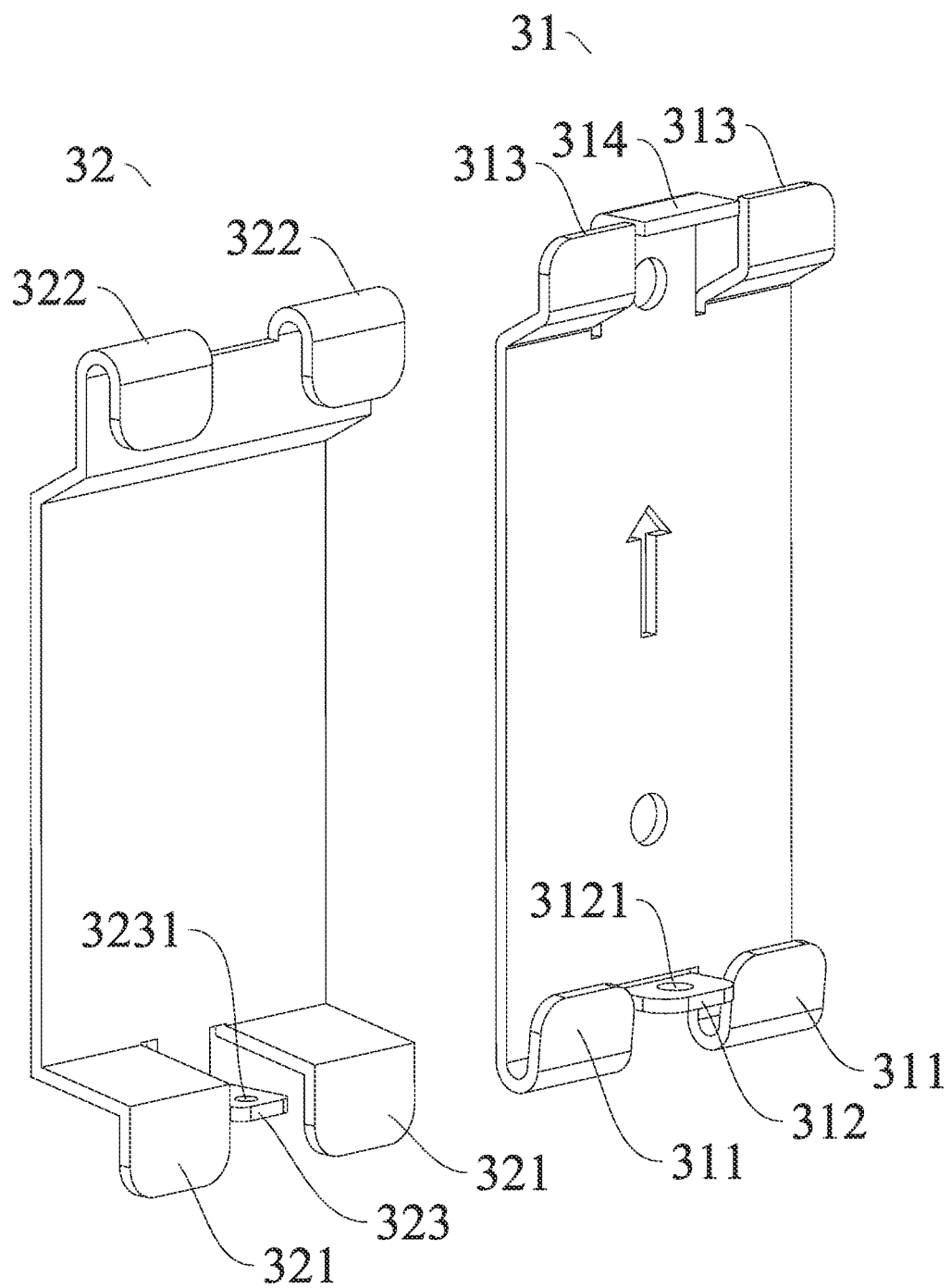
FIG. 11 is an exploded schematic diagram of the quick-release connecting assembly of the shooting device according to one embodiment of the present disclosure.
Figure 12:
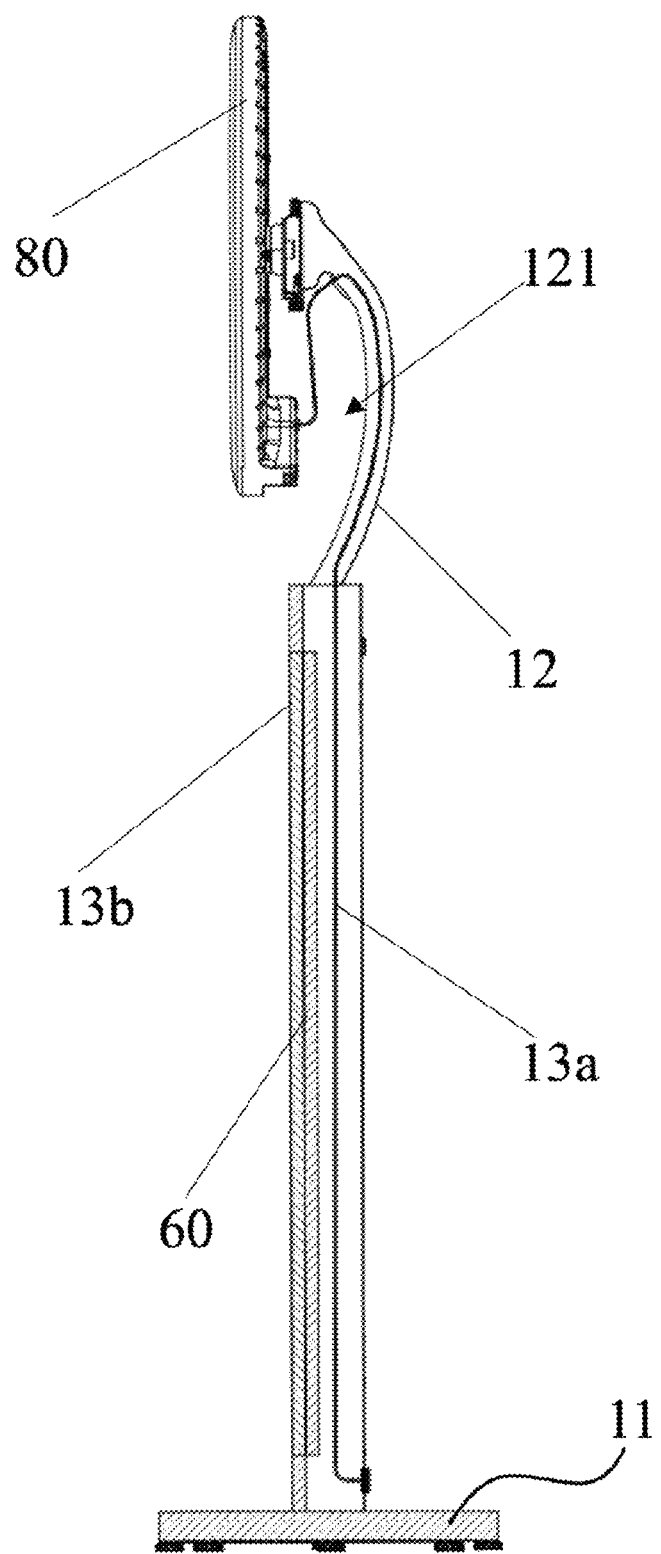
FIG. 12 is a cross-sectional view of the shooting device according to one embodiment of the present disclosure.

As shown in FIG. 7 and FIG. 9, a first switch 81 and USB interfaces 82 are disposed on the ring lamp 82. The first switch 81 is configured to turn on and turn off the ring lamp. The USB interfaces 82 are configured to be electrically connected with the shooting terminal 200, so as to supply power to the shooting terminal 200.

Specifically, the bottom shell 43 defines a notch 434. The connecting wire connecting the shooting terminal 200 and one of the USB interface passes through the notch 434.

By providing the notch 434 and the USB interfaces 82, the first light emitting piece 80 are allowed to be connected with the shooting terminal 200 and charge the shooting terminal 200, thereby improving battery life of the shooting terminal 200.

Furthermore, the bottom shell 43 includes a first shell 431 and a second shell 432. The second shell 432 is detachably connected with the first shell 431 and covers the rear side of the shooting terminal 200. The notch 434 is defined on the first shell 431 and corresponds to a bottom portion of the shooting terminal 200.

Specifically, the notch 434 is correspondingly disposed above the USB interfaces 82 to facilitate a connection between the shooting terminal 200 and the first light emitting piece 80.

In another embodiment, the first light emitting piece 80 may be a flexible light strip and is attached to the peripheral side of the fixing piece 40.

In other embodiments, the first light emitting piece 80 may be a first light bar.

As shown in FIGS. 2-3 and 5-6, the support bracket 10 includes a base 11 and a support rod 12. A first end of the support rod 12 is connected with the base 11, and a second end of the support rod 12 is connected with the universal adjusting piece 20.

A portion of the support rod 12 corresponding to the first light emitting piece 80 is bent to define a limiting space 121.

In one embodiment, the support rod 12 has an arc-shaped structure as a whole. When a pitch angle of the shooting terminal 200 is adjusted, one side of the first light emitting piece 80 close to the base 11 synchronously moves with the shooting terminal 200 toward the support rod 12 and the first light emitting piece 80 is at least partially located in a concave area of the support rod 12 of the arc-shaped structure to define the limiting space 121.

In another embodiment, the support rod 12 has a partially arc-shaped structure. A portion of the support rod 12 that is arc-shaped defines the limiting space that allowed the light emitting piece 80 to move therein when the first light emitting piece 80 moves along with the shooting terminal 200 to adjust the pitch angle.

Furthermore, a control application (APP) is installed in the shooting terminal 200. The control App is communicated with the first light emitting piece 80 and is configured to control a light emitting mode of the first light emitting piece 80.

Specifically, the first light emitting piece 80 is connected with a first circuit board 50, and the first light emitting piece 80 may has adjustment functions in color temperature, and/or color, and/or brightness, etc. The control APP is communicated with the first circuit board 50 through a wireless connecting module.

The control APP is configured to adjust the color temperature, and/or the color, and/or the brightness of the first light emitting piece 80, so that the first light emitting piece 80 can emit different lights according to needs, thereby enriching light-filling effects. Light emitting modes of the first light emitting piece 80 are directly controlled through the shooting terminal 200 to facilitate the user to quickly select a current light emitting mode.

Furthermore, the support bracket 10 further includes a support body 13. The support body 13 is connected between the support rod 12 and the base 11. A second light emitting piece 60 is disposed on the support body 13, The second light emitting piece 60 is also communicated with the control APP and is configured to adjust the color temperature, and/or the color, and/or the brightness of the second light emitting piece 60.

Specifically, a light emitting direction of the second light emitting piece 60 is substantially same as a light emitting direction of the first light emitting piece 80. The second light emitting piece 60 is disposed below the first light emitting piece 80. The second light emitting piece 60 is also configured to provide the supplementary light to the shooting terminal 200, thereby further improving the lighting effect on the shooting object.

Furthermore, the second light emitting piece 60 is attached to a surface of the support body 13, and the second light emitting piece 60 is disposed in the support body 13. A light transmitting piece 13b is disposed on the surface of the support body 13 corresponding to the second light emitting piece 60. Light emitted by the second light emitting piece 60 is emitted through the light transmitting piece 13b, and the second light emitting piece 60 is protected by the light transmitting piece 13b.

Optionally, the second light emitting piece 60 is a light bar, and the light bar is disposed in a vertical direction.

Furthermore, the support rod 12 and the support body 13 are hollow structures. The support body 13 is communicated with the support rod 12, so that the connecting wire is allowed to pass through the support rod 12 and the support body 13. The connecting wire is configured to electrically connect to an external power supply, the first light emitting piece 80, and the second light emitting piece 60.

Figure 5:
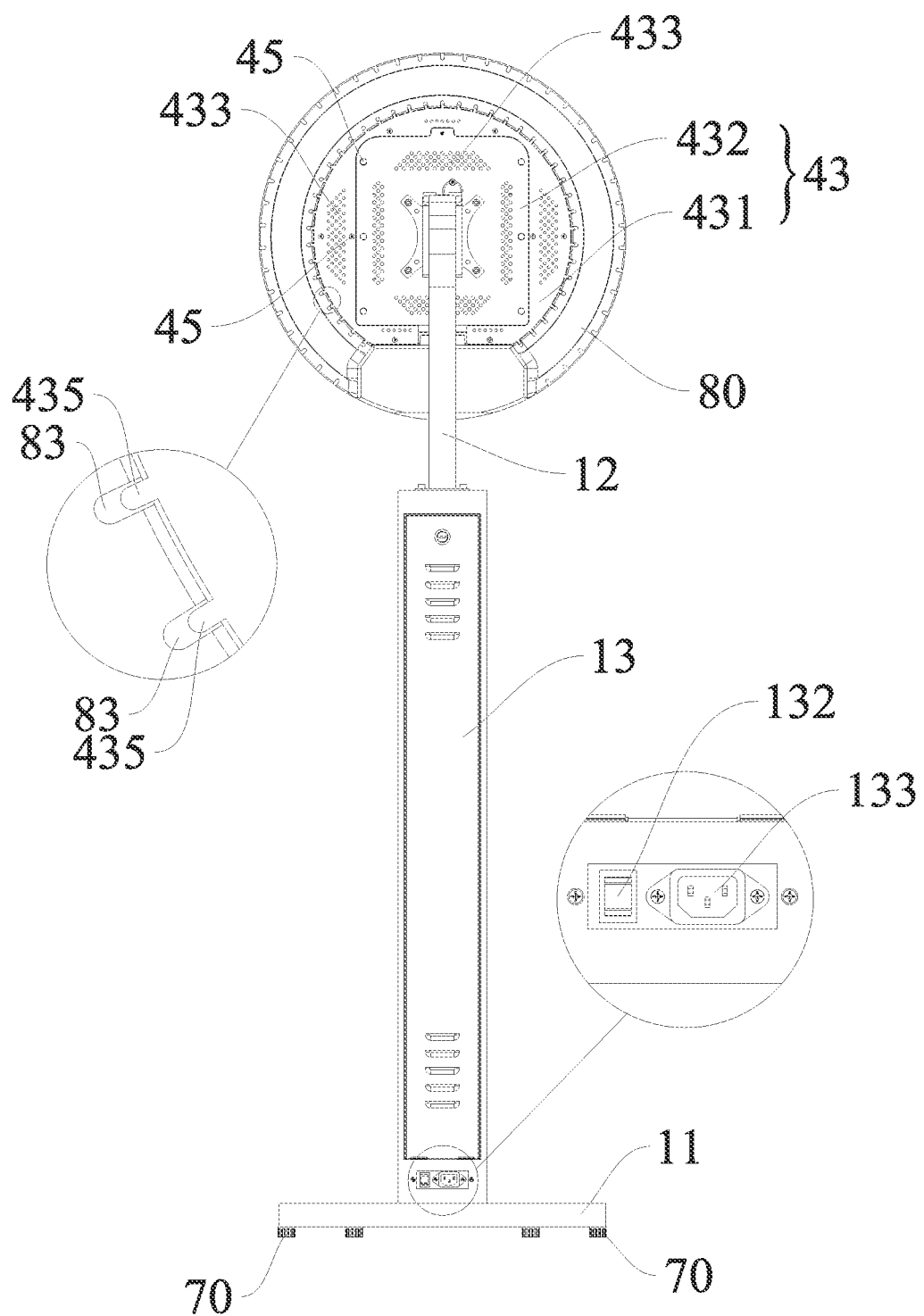
FIG. 5 is a rear schematic diagram of the shooting device according to one embodiment of the present disclosure.
Figure 6:
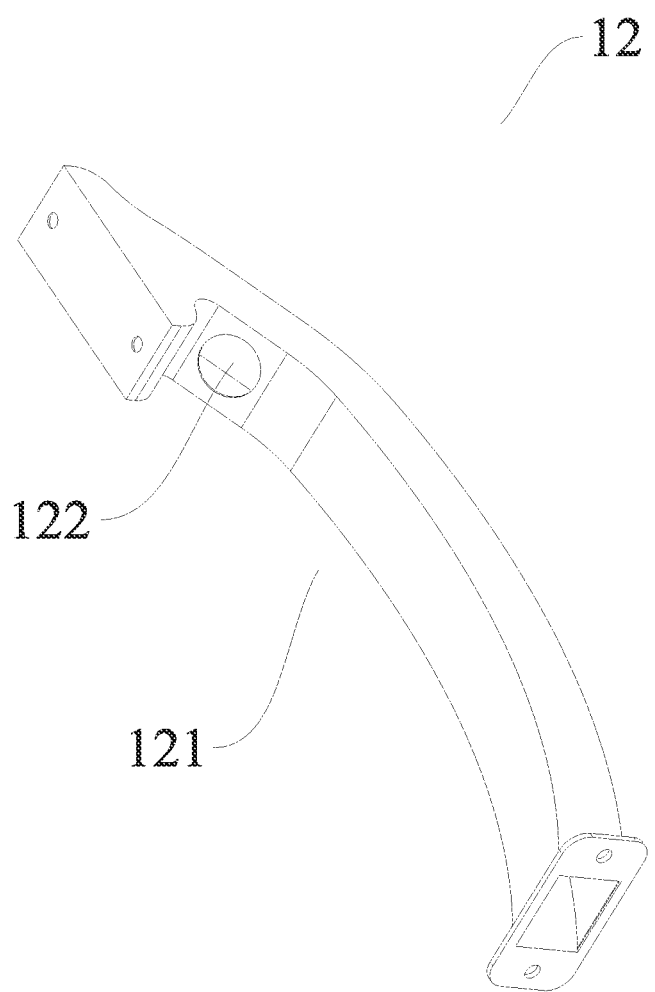
FIG. 6 is a schematic diagram of a support rod of the shooting device according to one embodiment of the present disclosure.

As shown in FIGS. 5 and 9, in one embodiment, a second circuit board 131, a second switch 132, and a power connector 133 are disposed on the support body 13. The second switch 132 and the power connector 133 are electrically connected with the second circuit board 131. The second circuit board 131 is electrically connected with the second light emitting piece 60 through the connecting wire.

Furthermore, the power connector 133 is configured to be connected with a power supply to supply power to the shooting device 100, and the second switch 132 is configured to turn on and turn off the second light emitting piece 60.

Furthermore, when the universal adjusting piece 20 is composed of the ball head 21 and the fixing rotating sleeve 22, one end of the support rod 12 close to the fixing piece 40 defined a wire outlet hole 122, and the connecting wire passes through the wire outlet hole 122 to connect with the first light emitting piece 80.

Furthermore, foot cups 70 that are adjustable in height are disposed on a bottom portion of the base 11, so that the shooting device 100 is able to be placed on an uneven ground by adjusting a height of each of the foot cups 70, which improves a practical effect of the shooting device 100.

The fixing piece 40 is configured to fix the shooting terminal 200, so that the shooting terminal 200 is stably placed on the shooting device 100.

Figure 8:
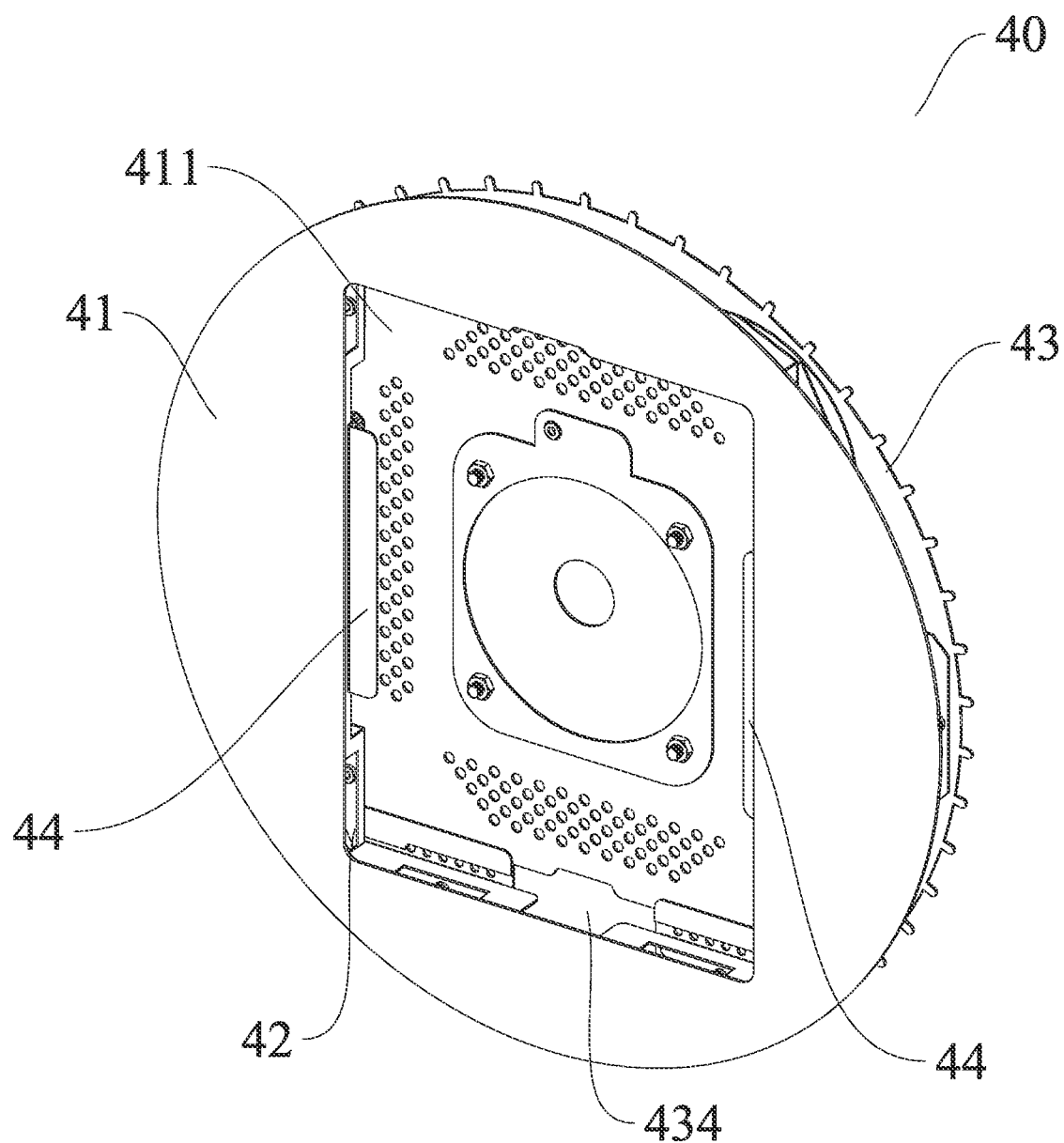
FIG. 8 is a schematic diagram of a fixing piece of the shooting device according to one embodiment of the present disclosure.

As shown in FIGS. 5 and 8, in one embodiment, the fixing piece 40 further includes a limiting frame 42 and abutting pieces 44. The limiting frame 42 is connected between the top shell 41 and the bottom shell 43. The shooting terminal 200 is disposed in the limiting frame 42. A display surface of the shooting terminal 200 abuts against an inner surface of the top shell 41. The abutting pieces 44 are connected with the limiting frame 42 and abut against a rear side of the shooting terminal 200.

Furthermore, the abutting pieces 44 respectively press against the rear side of the shooting terminal 200 to fix the shooting terminal 200.

In one embodiment, the abutting pieces 44 are detachably connected with the limiting frame 42 through locking pieces 45 and abut against the rear side of the shooting terminal 200. The locking pieces 45 may be, but are not limited to, bolts, screws, screw rods, etc.

In another embodiment, the abutting pieces 44 are elastic pieces. A first end of each of the abutting pieces 44 is connected with an inner surface of the bottom shell 43. After the bottom shell 43 is connected with the limiting frame 42, a second end of each of the abutting pieces 44 abuts against the rear side of the shooting terminal 200.

Furthermore, the top shell 41 defines a limiting hole 411, and the limiting hole 411 is configured to receive the display surface of the shooting terminal 200 and a camera of the shooting terminal 200, so that a user is able to conveniently control current light emitting modes of the first light emitting piece 80 and the second light emitting piece 60 through the display surface of the shooting terminal and control the camera to shot the shooting object.

By providing the limiting hole 411, when the shooting terminal 200 is not in the shooting state, it is convenient for the user to play the shooting terminal 200 disposed on the shooting device 100 for video or picture viewing, that is, the shooting device is also served as a shooting terminal holder.

Furthermore, the first shell 431 is detachably connected with the limiting frame 42 through the locking pieces 45. The second shell 432 is also detachably connected with the limiting frame 42. The shooting terminal 200 can be taken out of or placed in the limiting frame by opening the second shell 432.

Furthermore, heat dissipating holes 433 are defined on the bottom shell 43. The heat dissipating holes 433 are defined on both of the first shell 431 and the second shell 432, so that the shooting terminal 200 efficiently dissipate heat through the heat dissipating holes 433 during operation, and a situation that the heat dissipation effect is poor due to air non-circulation of the shooting terminal 200 is prevented.

Optionally, a thickness of the limiting frame 42 is greater than a thickness of the shooting terminal 200, so that a certain distance is formed between the rear side of the shooting terminal 200 and the bottom shell 43, which increases a space inside the fixing piece 40 and located on the rear side of the shooting terminal 200, improves flow efficiency of air around the rear side of the shooting terminal 200, and further improves the heat dissipation efficiency of the heat generated when the shooting terminal 200 works.

As shown in FIGS. 5 and 7, the universal adjusting piece 20 is disposed on the second shell 432. When the shooting terminal 200 needs to be taken out or placed in the limiting frame, the second shell 432 is directly detached from the first shell 431, so that the first light emitting piece 80 and the fixing piece 40 other than the second shell 432 are detached from the support bracket 10 and the universal adjusting piece 20.

Furthermore, a stepped surface (not shown in the drawings) is defined on an inner side of a light emitting surface of the first light emitting piece 80. The stepped surface is annular. A surface of the top shell 41 facing the bottom shell 43 partially abuts against the stepped surface of the first light emitting piece 80.

The top shell 41 is detachably connected with the bottom shell 43, so that the first light emitting piece 80 is sandwiched and connected between the top shell 41 and the bottom shell 43, realizing fixation of the first light emitting piece 80.

Furthermore, limiting grooves and/or limiting protrusions 435 are at least disposed on an outer peripheral side of the bottom shell 43. Limiting protrusions and/or limiting grooves 83 are corresponding disposed on the first light emitting pieces 80. The limiting protrusions 435 and/or the limiting grooves 83 of the first light emitting pieces 80 are one-to-one matched with the limiting grooves and/or the limiting protrusions 435 of the bottom shell 43.

The limiting protrusions 435 and/or the limiting grooves 83 of the first light emitting pieces 80 are one-to-one connected with the limiting grooves and/or the limiting protrusions 435 of the bottom shell 43, so that there is no relative rotation between the bottom shell 43 and the first light emitting piece 80, thereby ensuring fixing stability of the first light emitting piece 80 on the fixing piece 40.

Optionally, the limiting grooves 83 and the limiting protrusions 435 are evenly distributed.

In one embodiment, the limiting protrusions 435 are disposed on the bottom shell 43, the limiting grooves 83 one-to-one matched with the limiting protrusions 435 are defined on the rear side of the first light emitting piece 80.

In another embodiment, the limiting protrusions 435 are defined on the bottom shell 43, and limiting protrusions 435 one-to-one matched with the limiting grooves are disposed on the rear side of the first light emitting piece 80.

In other embodiment, the limiting grooves and the limiting protrusions 435 are disposed on the bottom shell 43. The limiting protrusions and limiting grooves 83 are corresponding disposed on the first light emitting pieces 80. The limiting protrusions 435 and the limiting grooves 83 of the first light emitting pieces 80 are one-to-one matched with the limiting grooves and/or the limiting protrusions 435 of the bottom shell 43. The limiting grooves 83 and the limiting protrusions 435 are disposed in different areas. Alternatively, the limiting grooves 83 and the limiting protrusions 435 disposed in an intersecting manner, that is, each of the limiting protrusions 435 is disposed between each two adjacent limiting grooves 83.

Optionally, the limiting grooves 83 and/or the limiting protrusions 435 are also disposed on the top shell 41. The limiting protrusion 435 and/or the limiting protrusion 435 are disposed on the stepped surface of the first light emitting piece 80. The limiting grooves 83 and/or the limiting protrusions 435 disposed on the top shell 41 are one-to-one matched with the limiting protrusion 435 and/or the limiting protrusion 435 disposed on the stepped surface of the first light emitting piece 80, so that the first light emitting piece 80 does not rotate relative to the top shell 41 and the bottom shell 43, which facilitates the fixation between the first shell 431 and the top shell 41.

As shown in FIGS. 1-2 and 10-11, a quick-release connecting assembly 30 is disposed between the support bracket 10 and the universal adjusting piece 20. The quick-release connecting assembly 30 includes a first connecting plate 31 and a second connecting plate 32. The first connecting plate 31 is disposed on the support bracket 10, and the second connecting plate 32 is disposed on the fixing piece 40. The first connecting plate 31 includes a first hanging portion. The second connecting plate includes a second hanging portion matched with the first hanging portion.

The second connecting plate 32 is hung on the first connecting plate 31, so that the fixing piece 40 and the first light emitting piece 80 are connected with the support bracket 10. The second connecting plate is separated from the first connecting plate 31 so that the fixing piece 40 and the first light emitting piece 80 are separated from the support bracket 10.

In one embodiment, the first hanging portion includes two first hooking portions 311, a first limiting portion 312, and two first inserting portions 313. The two first hooking portions 311 are spaced apart by a certain distance. The first limiting portion 312 is disposed between the two first hooking portions 311, and the two first inserting portions 313 are located above the first limiting portion 312.

The second hanging portion includes two second inserting portions 321 and two second hooking portions 322. The second inserting portions 321 are one-to-one corresponds to the first hooking portions 311, and the second hooking portions 322 are one-to-one corresponding to the first inserting portions 313.

A hooking direction of each of the first hooking portion 311 is opposite to a hooking direction of each of the second hooking portions 322. Specifically, the hooking direction of each of the first hooking portions 311 is disposed upward, and the hooking direction of each of the second hooking portions 322 is disposed downward.

When the first connecting plate 31 is connected with the second connecting plate 32, the first limiting portion 312 is limited between the two second inserting portions 321.

The first limiting portion 312 is limited between the two second inserting portions 321, so that the second connecting plate 32 does not deviate in a horizontal direction relative to the first connecting plate 31 under an action of the two second inserting portions 321 and the first limiting portion 312, preventing the second connecting plate 32 from sliding off from the first connecting plate 31.

Furthermore, the first hanging portion includes the two first inserting portions 313 spaced apart by the certain distance, and the second hanging portions includes the second hooking portions corresponding to the two first inserting portions 313, so that the connection between the first connecting plate 31 and the second connecting plate 32 is stable.

Optionally, a second limiting portion 314 is disposed between the two first inserting portions 313. When the first connecting plate 31 is connected with the second connecting plate 32, the second limiting portion 314 is limited between the two second hooking portions 322.

By providing the second limiting portion 314 and the first limiting portion 312, the connection between the first connecting plate and the second connecting plate is stable.

Furthermore, a blocking portion 323 is disposed between the two second inserting portions 321. When the first connecting plate 31 is connected with the second connecting plate 32, the first limiting portion 312 abuts against the blocking portion 323.

Specifically, when the second connecting plate 32 is inserted into the first connecting plate 31, a lower surface of the blocking portion 323 at least partially abuts against an upper surface of the first limiting portion 312.

Furthermore, the first limiting portion 312 defines a first fixing hole 3121, and the blocking portion 323 defines a second fixing hole 3231. When the first connecting plate 31 is connected with the second connecting plate 32, the second fixing hole 3231 faces the first fixing hole 3121, and the first fixing hole may be fixed to the second fixing hole by a locking structure (not shown in the drawings). The locking structure is selected from a bolt, a screw, a clamping pin, etc.

By providing the locking structure to fix the first connecting plate 31 and the second connecting plate 32, the stability of the connection between the first connecting plate 31 and the second connecting plate 32 is further improved, which further prevents first light emitting piece 80 and the fixing piece 40 from separating from the support bracket 10.

In another embodiment, the first hanging portion includes a first hooking portion 311, the first limiting portion 312, and two first inserting portions 313. The two first inserting portions 313 are spaced apart by a certain distance, the first limiting portion 312 is disposed between the two first inserting portions 313, and the first hooking portion 311 is disposed below the two first limiting portions 312. The second hanging portion includes a second inserting portion 321 and two second hooking portions 322. The second inserting portion 321 is corresponding to the first hooking portion 311, and the two second hooking portions 322 are one-to-one corresponding to the two first inserting portions 313.

Furthermore, a hooking direction of the first hooking portion 311 is opposite to a hooking direction of the second hooking portion 322. Specifically, the hooking direction of the first hooking portion 311 is disposed upward, and the hooking direction of the second hooking portion 322 is disposed downward. When the first connecting plate 31 is connected with the second connecting plate 32, the first limiting portion 312 is limited between the two second hooking portions 322.

In the specification and claims of the present disclosure, terms "comprise/include" and terms "have/contain" and their variants are used to designate existence of stated features, values, steps or components, but do not exclude the existence or addition of one or multiple other features, values, steps, components, or combinations thereof.

For clarity of explanation, some features of the present disclosure are described in different embodiments. However, these features can also be combined and described in a single embodiment. Moreover, some features of the present disclosure are only described in a single embodiment for the sake of brevity. However, these features can also be described in different embodiments separately or in any suitable combination.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A shooting device, comprising:
a first light emitting piece,
a first circuit board, and
a fixing piece;
wherein the first circuit board is electrically connected to the first light emitting piece, the first light emitting piece is adjusted by the first circuit board to adjust color temperature, and/or color, and/or brightness; the first light emitting piece is disposed on a peripheral side of the fixing piece; the fixing piece comprises a top shell, a limiting frame, and a bottom shell; the limiting frame is connected between the top shell and the bottom shell; the shooting terminal is disposed in the limiting frame; and a display surface of the shooting terminal abuts against an inner surface of the top shell to maintain fixation of the shooting terminal relative to the fixing piece;
wherein the first light emitting piece is ring shaped, and a hollow portion of the ring-shaped first light emitting piece is clamped between the top shell and the bottom shell.

2. The shooting device according to claim 1, wherein the first light emitting piece is fixed between the top shell and the bottom shell to maintain fixation of the first light emitting piece relative to the fixing piece; and a peripheral edge of the fixing piece is detachably connected with an inner edge of the first light emitting piece by any one of: screw locking, clamping, magnetic attraction connection.

3. The shooting device according to claim 1, wherein the first light emitting piece comprises at least one USB interface; the at least one USB interface is electrically connected to the shooting terminal, the bottom shell of the fixing piece defines a notch; and a connecting wire connecting the shooting terminal to the at least one USB interface passes through the notch.

4. The shooting device according to claim 1, wherein the top shell defines a limiting hole, and the limiting hole is configured to limit the display surface of the shooting terminal and a camera of the shooting terminal.

5. The shooting device according to claim 1, wherein heat dissipating holes are defined on the bottom shell.

6. A shooting device, comprising:
a support bracket,
a universal adjusting piece,
a first light emitting piece,
a first circuit board, and
a fixing piece;
wherein a power supply connecting line of the first circuit board is connected from bottom to top along a height direction of the support bracket, the first light emitting piece is connected to the first circuit board, the first light emitting piece is adjusted by the first circuit board to adjust color temperature, and/or color, and/or brightness; the support bracket comprises a base, a support rod, and a support body; a first end of the support rod is connected to the support body, a second end of the support rod is connected to the fixing piece through the universal adjusting piece, the fixing piece is configured to fix the shooting terminal, the base is connected to the support body; and the support rod defines a limiting space at a position corresponding to a pitch angle formed by at least a portion of the first light emitting piece and the fixing piece; when the pitch angle of the first light emitting piece and the fixing piece is adjusted, the at least portion of the first light emitting piece and the fixing piece is movable in the limiting space;
the first light emitting piece comprises at least one USB interface; the at least one USB interface is electrically connected to the shooting terminal, a bottom shell of the fixing piece defines a notch; and a connecting wire connecting the shooting terminal to the at least one USB interface passes through the notch.

7. The shooting device according to claim 6, wherein the support rod is bent or has a curvature, bending away from the first light emitting piece and the fixing piece to form the limiting space, one end of the support rod close to the fixing piece defined a wire outlet hole.

8. The shooting device according to claim 6, wherein the first light emitting piece is disposed on a peripheral side of the fixing piece, and the first light emitting piece and the fixing piece synchronously adjust the pitch angles thereof.

9. A shooting device, comprising:
a support body,
a support rod, a first light emitting piece,
a second light emitting piece,
a power connector,
a first circuit board, and
a second circuit board;
a fixing piece;
wherein the second light emitting piece is disposed on the support body; the second light emitting piece is a light bar, the light bar is disposed along a vertical direction; the second light emitting piece is disposed below the first light emitting piece, a light emitting direction of the second light emitting piece is approximately same as a light emitting direction of the first light emitting piece; the first light emitting piece is electrically connected to the first circuit board, the second light emitting piece is electrically connected to the second circuit board, the first circuit board is configured to adjust color temperature, and/or color, and/or brightness of the first light emitting piece; the second light emitting piece is arranged inside the support body and extends along a length direction of the support body; the power connector is configured to be connected to a power supply to supply power to the shooting device, and the first light emitting piece and the second light emitting piece respectively receive power from the power supply through the first circuit board, the second circuit board, connecting wires, and the power connector;

the first light emitting piece comprises at least one USB interface; the at least one USB interface is electrically connected to a shooting terminal, a bottom shell of the fixing piece defines a notch; and a connecting wire connecting the shooting terminal to the at least one USB interface passes through the notch.

10. The shooting device according to claim 9, wherein the second light emitting piece is disposed in the support body, a light transmitting piece is disposed on a surface of the support body, and light of the second light emitting piece penetrates through the light transmitting piece.

11. The shooting device according to claim 9, wherein the support body and the support rod are hollow structures, and the connecting wires of the shooting device pass through the support body and the support rod.

12. The shooting device according to claim 2, wherein, the first light emitting piece surrounds and covers the peripheral edge of the bottom shell.

\* \* \* \* \*